United States Patent [19]
Cain et al.

[11] Patent Number: 5,593,141
[45] Date of Patent: Jan. 14, 1997

[54] CLOSE FITTING GATE

[75] Inventors: David A. Cain; David Drowns, both of Arlington, Tex.

[73] Assignee: Cain Fence Rental, Inc., Arlington, Tex.

[21] Appl. No.: 331,758

[22] Filed: Oct. 31, 1994

[51] Int. Cl.⁶ ..................................... E05D 7/00
[52] U.S. Cl. ............... 256/26; 256/73; 49/394; 49/503; 292/218; 292/202
[58] Field of Search .................... 292/218, 202; 49/394, 381, 501, 503; 256/26, 73

[56] References Cited

U.S. PATENT DOCUMENTS

| | | | |
|---|---|---|---|
| 355,645 | 1/1887 | Ewing et al. | 292/237 |
| 390,645 | 10/1888 | Booth | 292/237 |
| 1,112,715 | 10/1914 | Miller. | |
| 1,168,234 | 1/1916 | Tausch | 292/216 |
| 1,429,389 | 9/1922 | Weintz | 292/216 |
| 1,447,705 | 3/1923 | Anderson | 292/53 |
| 1,917,159 | 7/1933 | Schaaf | 292/218 X |
| 2,510,520 | 6/1950 | Remmele | 292/216 |
| 3,056,475 | 10/1962 | Benham | 49/501 |
| 3,060,523 | 10/1962 | Benham | 49/381 |
| 3,740,897 | 6/1973 | Johns | 49/381 |
| 3,774,947 | 11/1973 | Duncan | 292/216 X |
| 3,811,149 | 5/1974 | Griffin | 16/130 |
| 4,111,475 | 9/1978 | McCormick et al. | 292/216 |
| 4,124,954 | 11/1978 | Redick | 49/236 |
| 4,610,109 | 9/1986 | Ruigrok | 49/381 |
| 4,790,578 | 12/1988 | Barrera | 49/394 X |
| 4,930,753 | 6/1990 | Alvyn | 256/26 |
| 5,103,658 | 4/1992 | McQuade | 70/77 |

*Primary Examiner*—Terry Lee Melius
*Assistant Examiner*—Christopher J. Novosad
*Attorney, Agent, or Firm*—Geoffrey A. Mantooth

[57] ABSTRACT

A gate which hingedly fits closely between two spaced apart fence posts is provided. The gate has a hinge side member which extends directly adjacent a fence post. The hinge side member includes offset portions, each of which is displaced from the respective fence post by a gap. A hinge extends from the fence post across the gap of each offset portion to hingedly couple the gate to the fence post. The gate also has a latch side member which may be removably secured about another fence post. A sleeve having a gate latch coupled thereto is rotatably coupled about the latch member. The latch member has a slot extending therethrough and the sleeve has a notch extending therethrough. The sleeve may be rotated to a locking position on the latch side member where the notch is located over a portion at the slot. A rod extends inside of the latch side member. The rod has a cap end and a hooked end. The hooked end of the rod may be adjusted in the slot and notch by moving the cap end. The hooked end adjusts to lock and unlock the sleeve and the gate latch.

9 Claims, 5 Drawing Sheets

CLOSE FITTING GATE

FIELD OF THE INVENTION

The present invention relates to a gate for a fence, and in particular to a gate which closely fits together with a fence.

DESCRIPTION OF THE RELATED ART

Fences are commonly used to restrict the movement of animals on farms and ranches. Gates are provided in a fence to permit easy access to the animals within the fenced area and to allow movement of the animals into and out of the fenced area. A gate is typically joined to a fence with hinges along one side of the gate so that the gate may be easily open and shut. A latch mechanism is used to removably attach the opposite side of the gate to the fence so the gate may be secured to the fence when the gate is closed.

Typically, a substantial gap extends between each side of the gate and the fence. On one side of the gate, the hinges that couple the gate and the fence together extend between the gate and the fence and create a gap therebetween. On the other side of the gate, the latching mechanism typically extends outwards from the gate and creates a gap between the gate and the fence when the gate is closed.

Gaps between a gate and a fence can prove harmful to certain types of animals, such as ostriches or emus. Ostriches and emus are commonly raised on ranches kept in a fenced area to keep the birds from escaping into the wild. The birds like to scratch their necks along the top bars of gates and fences by rubbing their necks along the bars. An ostrich or an emu may work its neck into one of the gaps between a conventional gate and a fence and thus get its head trapped outside the fence. With its neck caught in the gap, the bird may panic and attempt to forcibly pull its head back through the gap, resulting in the bird's death. Ostriches and emus are very expensive birds and substantial economic losses can be incurred as a result of interactions of the birds with conventional gates. Therefore, there is a need for a close fitting gate which substantially eliminates gaps between the gate and the fence.

SUMMARY OF THE INVENTION

It is therefore an object of the invention to provide a gate apparatus and a method of using the gate apparatus wherein both the hinge side and the latch side of the gate apparatus fit close to the fence posts of fencing.

A gate is provided which closely fits between first and second fence posts and is hingedly coupled to the first fence post and is removably latched to the second fence post. The gate has a frame and fencing material supported by said frame. The fencing material forms a barrier. The frame has a side member, which side member has a main portion. The main portion having elbows therein so as to form offset portions. The offset portions being parallel to said main portion of said side member. A hinge is coupled to each offset portion.

The gate also has a latch side member having a wall that defines a cavity. The wall has a slot extending therethrough. There is a sleeve that is rotatably coupled about said member. The sleeve has a notch therein that aligns with and overlaps a portion of said slot when said sleeve is in a locking position. A rod is located within the cavity. The rod has a hooked end located in the slot. The rod is structured and arranged to extend between and assume first and second positions. In said first position, the rod is positioned with its hooked end extending through the slot and through the notch in the sleeve, with the sleeve being located in its locking position, preventing rotation of the sleeve about the member. In the second position, the rod is positioned with its hooked end extending through the slot, with the hooked end being located outside of the sleeve notch. The sleeve is free to rotate about the member. A gate latch is coupled to the sleeve. The gate latch is structured and arranged to be removed from a fence post by rotation of the sleeve from its locking position.

A method of operating a close fitting gate is also disclosed. A latch post is provided. A gate is also provided, where the gate has a tubular latching member which comprises: a rotatable portion and a stable portion; a notch extending through each portion; a liftable cap located about an end of the latching member; a rod coupled to the cap extending from the cap through the latching member to the notch; and a gate latch coupled to the rotatable portion of the latching member. The cap is moved relative to the end of the latching member, and the rod is moved in the notch in response to movement of the cap. The rotatable portion of the latching member is rotated to adjust a position of the gate latch relative to the latch post, and a position of the latching member is adjusted relative to the latch post to open or close the gate.

With the present invention, a gate is provided in a close fitting relationship to the respective fence posts. The gate has a hinge side member and a latch side member, both of which fit closely to their respective fence posts. The hinge side member has offset portions therein. The offset portions receive the hinges, which hinges are also coupled to a hinge fence post. By offsetting that portion of the gate that receives the hinges from the remainder of the gate, the gate fits close to the hinge fence post.

The latch side member has a fence latch for coupling to a latch fence post. The fence latch is mounted to the latch side member by way of a sleeve that can rotate about the latch side member. Rotation of the sleeve relative to the latch side member is prevented by the insertion of a pin through both the sleeve and the latch side member. The pin can be part of a rod so as to provide a convenient location (such as the top of the latch side member) for moving the pin in and out of engagement with the sleeve. In a preferred embodiment, the rod is located inside of the latch side member.

DESCRIPTION OF THE PREFERRED EMBODIMENT

Figure 1:
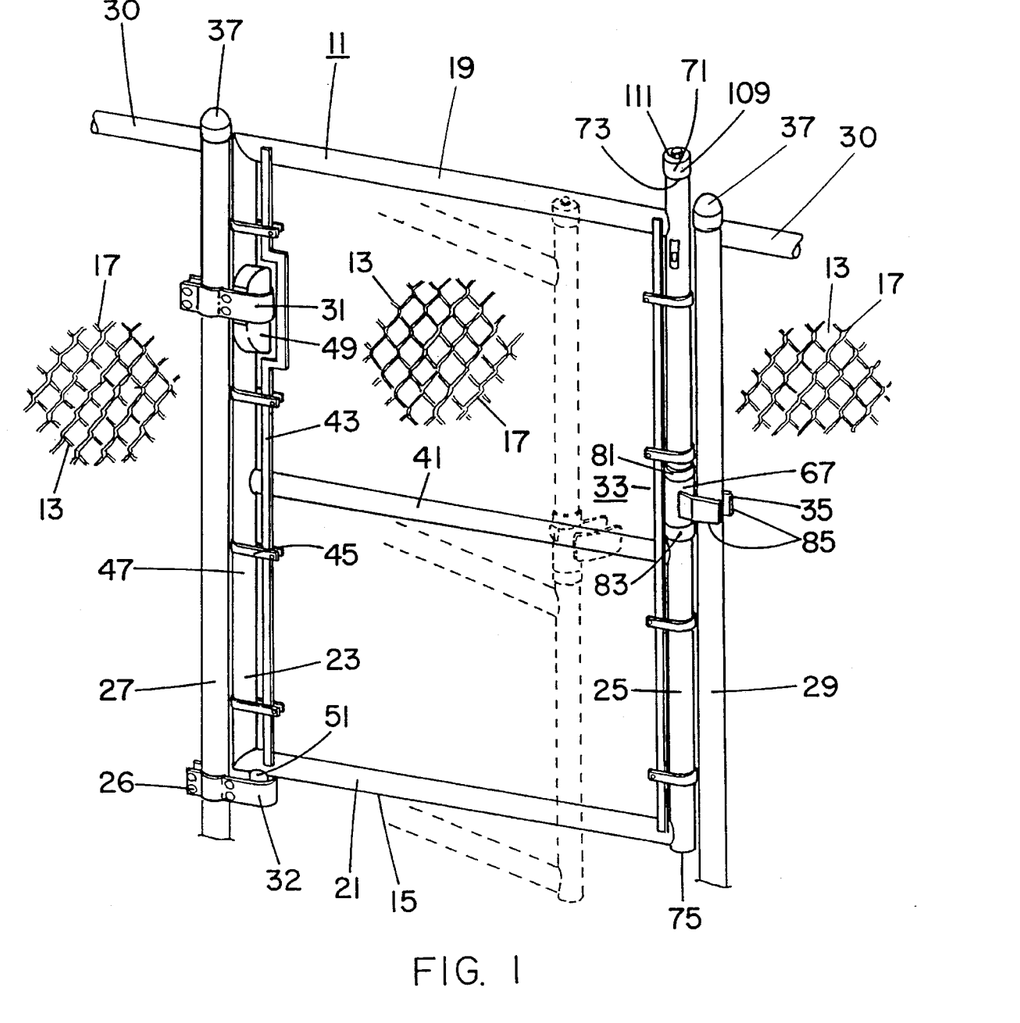
FIG. 1 is an isometric view of the close fitting gate of the present invention, in accordance with a preferred embodiment.

In FIG. 1 there is shown the gate 11 of the present invention located between fencing sections 13. The gate 11 may swing between an open position (shown in dashed lines) permitting across through the fencing sections 13 and a closed position (shown in solid lines) providing a continuous barrier in conjunction with the fencing sections 13. The gate 11 has a frame 15 which supports chain link fencing 17. The frame 15 has top and bottom members 19 and 21 which extend between and couple a hinge side member 23 and a latch side member 25.

The hinge side member 23 and the latch side member 25 extend directly adjacent to a hinge post 27 and a latch post 29, respectively, of the fencing sections 13 when the gate 11 is located in its closed position. The hinge and latch post 27 and 29 are conventional fence posts. The hinge side member 23 receives and is coupled by hinges 31, 32 extending from the hinge post 27 while maintaining close proximity to the hinge post 27. The latch side member 25 has a latching mechanism 33 located within and about the side member 25 for operating a gate latch 35 which enables the side member 25 to be located very close (within one half inch) to the latch post 29.

The fencing sections 13 are conventional. In the preferred embodiment, the fencing is of the chain link type. However, the present invention can be used with other types of fencing, such as wire mesh, etc. Each fencing section 13 has a vertical post 27, 29 that is set into the ground (for example, by concrete anchors). The posts have horizontal top bars 30 coupled thereto. The top bars extend to other vertical posts (not shown). Chain link 17 is coupled to the vertical posts and to the top bars in accordance with conventional techniques.

Referring back to FIG. 1, the general construction of the gate 11 will be described. The members 19, 21, 23, and 25 of the frame 15 are formed of standard metal tubing welded together in a generally rectangular shape. The top member 19 extends transversely between the side members 23 and 25. The bottom member 21 extends transversely between the side members 23 and 25 a short distance above the ground. A center support member 41 formed of metal tubing extends transversely between the side members 23 and 25 centered between the top and bottom members 19 and 21. Conventional chain link fencing 17 extends between the members 19, 21, 23 and 25. The chain link is secured to the members by conventional techniques. For example, the chain link 17 is secured to the side members 23, 25 by bars 43. The bars are inserted into the side loops of the chain link. The bars 43 are coupled to the side members 23, 25 by conventional bands 45. The bands 45 are looped around the respective member and the ends of each band are coupled together with a fastener. The top and bottom edges of the chain link 17 are coupled to the top and bottom members 19, 21 by wire ties that loop around both the respective member and the chain link edge portion.

The offset hinge arrangement for the gate will now be described. Referring to FIG. 1, the hinge side member 23 of the gate is coupled to the hinge post 27 by hinges 31 and 32 which extend from the hinge post 27. The hinge side member 23 has a main body 47 and upper and lower hinge portions 49 and 51. The hinges 31, 32 are conventional and commercially available gate hinges which are clamped to the hinge post 27 with bolts 26 and extend from the hinge post 27 to couple to the upper and lower hinge portions 49 and 51, respectively, of the hinge side member 23. The hinge portions 49 and 51 compensate for the length of the hinges 31 so the main body 47 of the side member 23 is positioned closely to the hinge post 27. The fencing bar 43 extending adjacent the hinge side member 23 is shaped corresponding to the shape of the side member 23 in order to accommodate the hinge portion 49.

Figure 2:
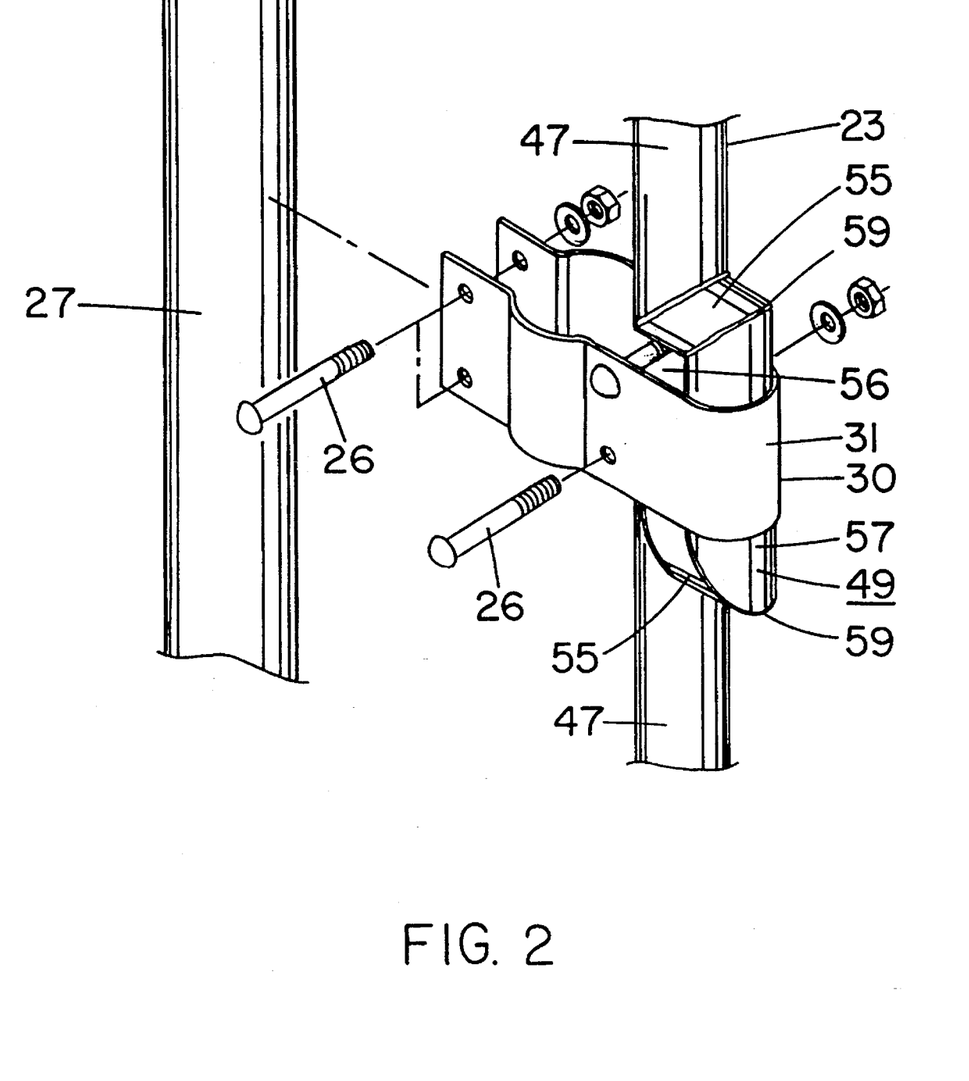
FIG. 2 is an exploded view of the upper joint and hinge of the close fitting gate.

As shown in FIG. 2, the upper hinge portion 49 is a U-shaped (when rotated ninety degrees) piece which extends from the main body 47 of the hinge side member 23 in an upper portion of the side member 23. The upper hinge portion 49 includes arms 55 which are coupled to the main body 47 of the side member 23. The arms 55 extend transverse to the main body 47 and are directed away from the hinge post 27 when the gate is closed. A displaced or offset portion 57 is coupled to the ends 59 of the arms 55 and extends transversely to the arms 55 and parallel to the side member 23. The offset portion 57 extends between the arms 55. A gap 56 extends between the displaced section and the hinge post 27 when the gate is coupled to the fence. In a preferred embodiment, the main body 47, arms 55 and the displaced section 57 are securely welded together.

Hinge 31 hingedly couples the offset portion 57 to the hinge post 27 so that the hinge side member 23 may pivot adjacent to the hinge post 27 to swing the gate 11 open and closed. The arms 55 position the offset portion 57 an appropriate distance away from the hinge post 27 for the hinge 31 to extend across the gap 56 and couple the hinge post 27 and the displaced section 57 of the portion 49. The hinge 31 is clamped around the hinge post 27 with bolts 26. The hinge 31 has an end 30 that extends about the offset portion so that the offset portion may rotate within the hinge 31 when the gate 11 is opened or closed.

Figure 3:
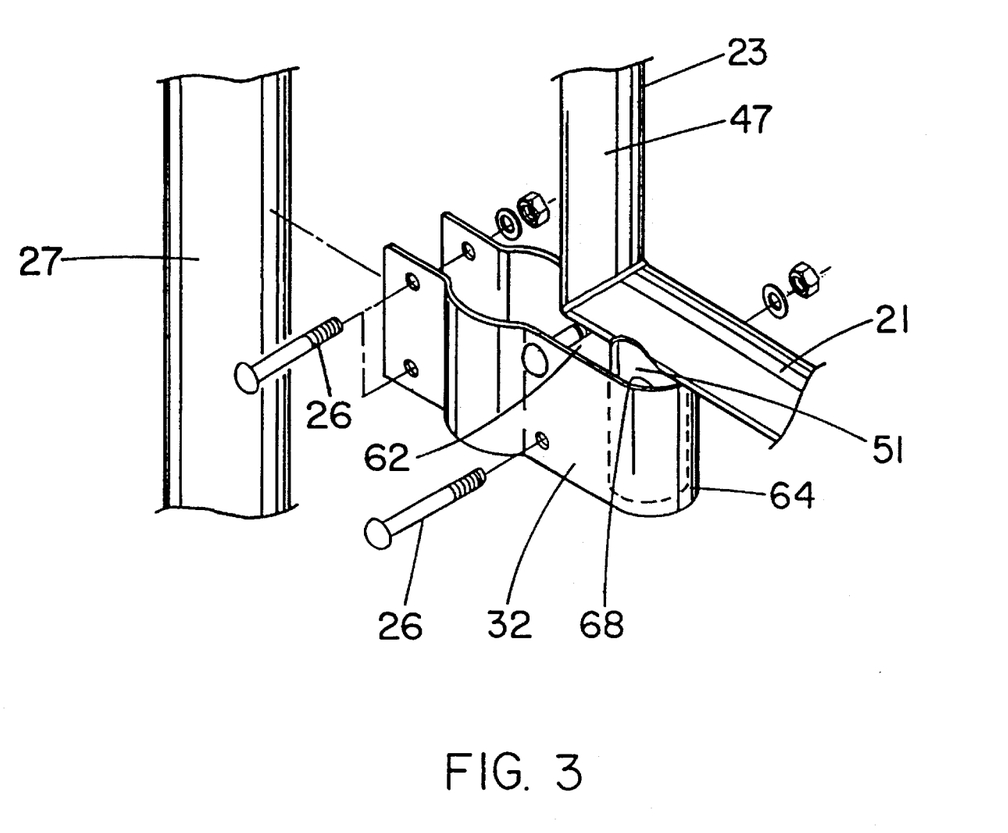
FIG. 3 is an exploded view of the lower joint and hinge of the close fitting gate.

Referring now to FIG. 3, the lower hinge portion 51 is a stub shaft that protrudes downwardly towards the ground from the bottom member 21. The shaft 51 is parallel to the hinge side member 23. The shaft 51 is offset from the hinge side member 23 so as to create a gap 62 between the shaft 51 and the edge of the gate (as represented by the hinge side member 23). In a preferred embodiment, the shaft 51 and bottom member 21 are securely welded together.

Hinge 32 hingedly couples the shaft 51 to the hinge post 27 so the hinge side member 23 may pivot adjacent to the hinge post 27 to swing the gate 11 open and closed. The hinge 32 is clamped around the hinge post 27 with bolts 26. An end 64 of hinge 32 is located about shaft 51 so that the shaft 63 may rotate within the hinge 32 when the gate 11 is opened or closed. The bottom member 21 bears on the upper edge 68 of the hinge 32. A washer (not shown) is commonly located around the shaft 51 between the hinge 32 and the bottom member 21. The washer eases rotation of the gate in the hinge 32. The hinge 32 is spaced apart from the ground a sufficient distance to allow the gate 11 to swing freely about the hinges 31, 32.

Figure 4:
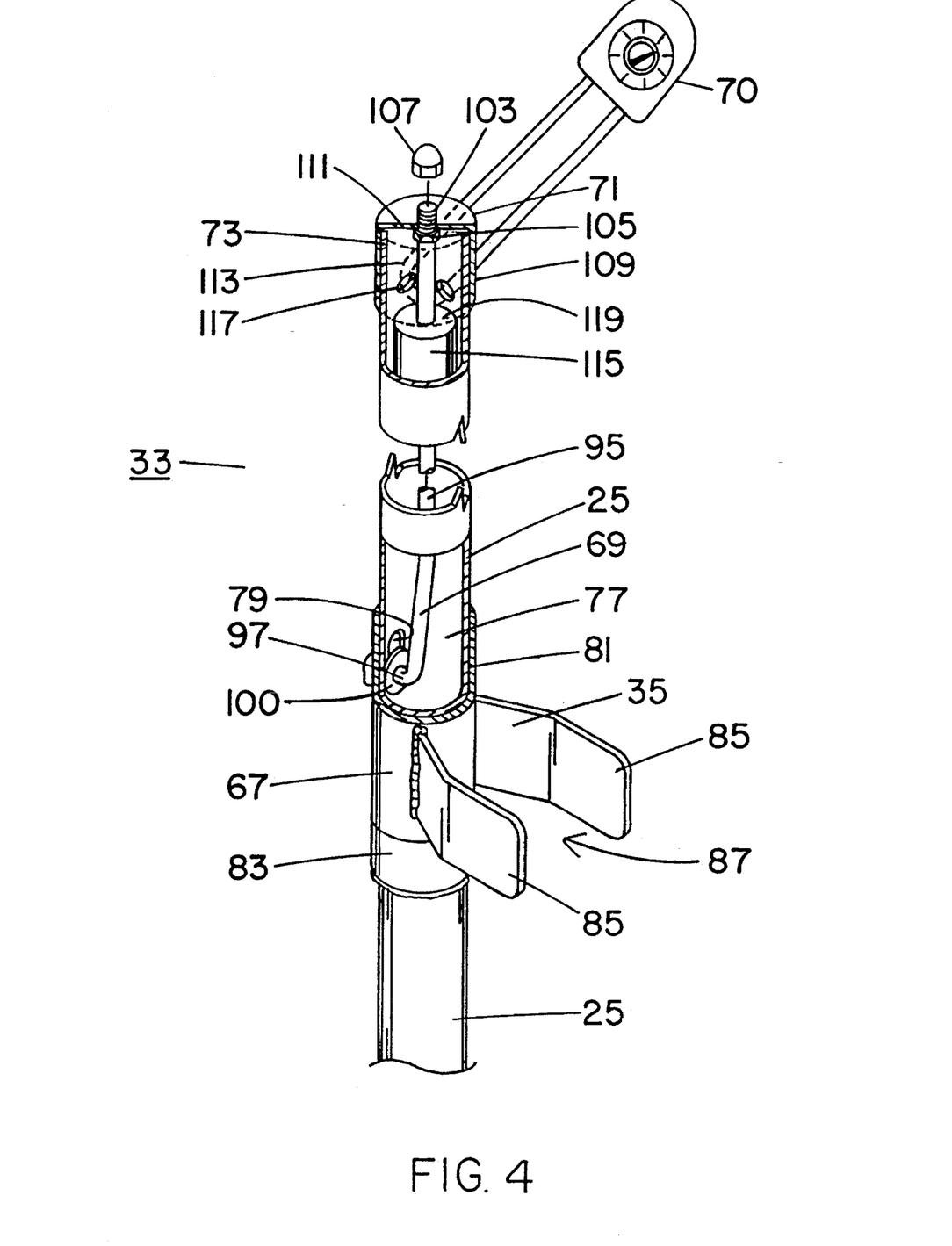
FIG. 4 is an isometric, partial cross-sectional view of the latch side member and latching mechanism of the close fitting gate.
Figure 5:
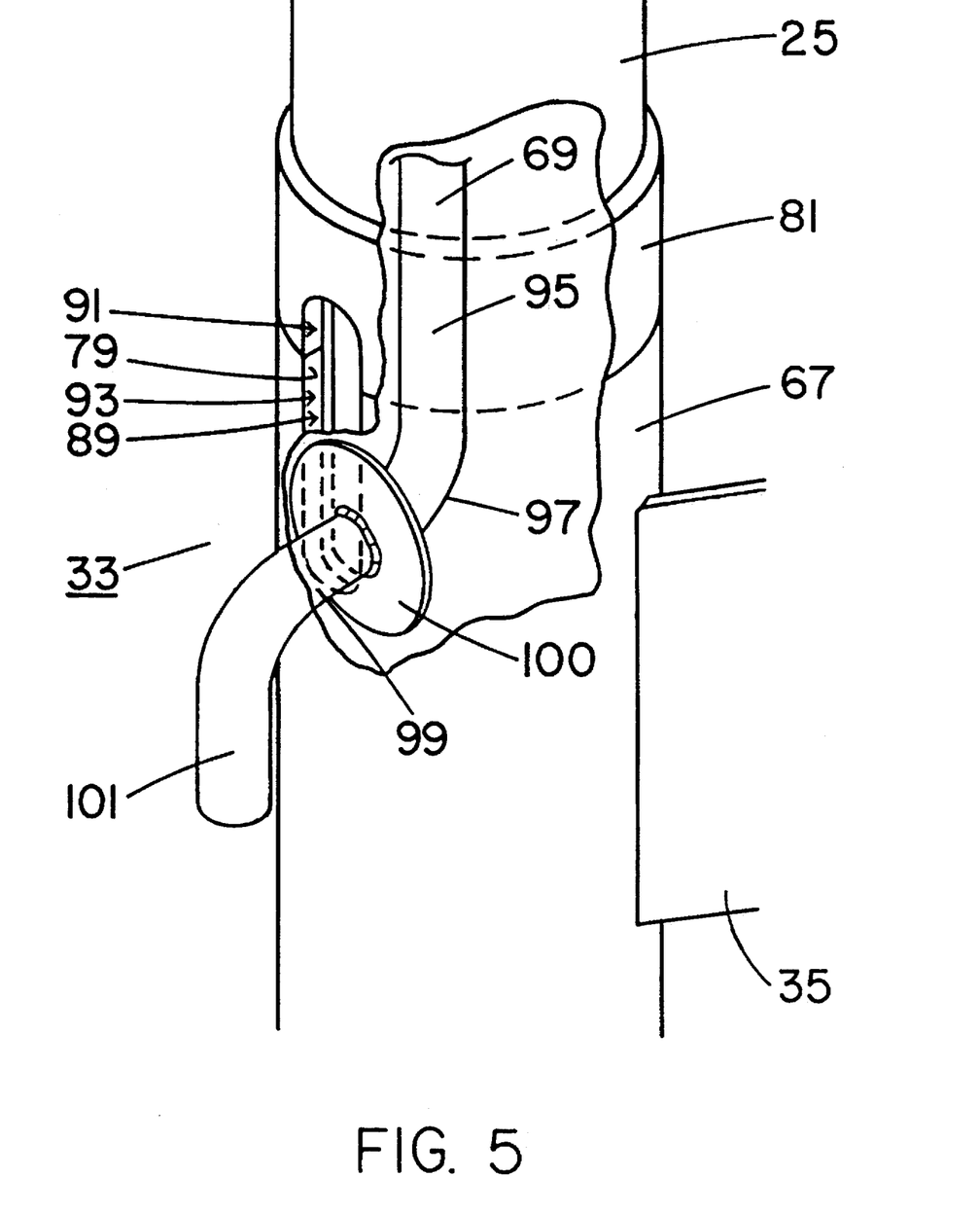
FIG. 5 is an isometric view of the hooked end of the rod, the slot and the notch in the latch side member.

The close fit latch arrangement for the gate will now be described. Referring to FIGS. 1, 4 and 5, the latch side member 25 is configured to extend directly adjacent to the latch post 29 and to removably secure the gate 11 to the latch post 29 with the gate latch 35. The latching mechanism 33 of the latch side member 25 enables the side member 25 to be removably secured to the latch post 29 directly proximate to the post 29. The latching mechanism 33 includes the gate latch 35 coupled to a sleeve 67 that is rotatably located about the side member 25, a rod 69 located within the side member 25 and positioned to either prevent or allow rotation of the sleeve 67 about the side member 25, and a cap 71 coupled to the rod 69 at the top of the side member 25 for positioning the rod 69 to govern the rotatability of the sleeve 67. The gate latch 35 is latched to or unlatched from the latch post 29 by rotation of the sleeve 67 to appropriately position the gate latch 35 for attachment to or removal from the post 29.

As shown in FIGS. 1 and 4, the latch side member 25 is a cylindrical tube extending between a top end 73 and a bottom end 75. The top end 73 is located above the top end 37 of the latch post 29, and the bottom end 75 is located a short distance above the ground. The latch side member 25 has a cavity 77 therein.

An elongated slot 79 extends through the latch side member 25 through which the rod 69 may extend from the cavity 77 to lock or unlock the sleeve 67 so the gate latch 35 may be latched or unlatched about the latch post 29. The slot 79 extends lengthwise parallel to the longitudinal axis of the side member 25. The width of the slot 79 is slightly larger than the diameter of the rod 69 so the rod 69 may be moved in the slot 79 along the length of the slot 79.

Referring now to FIGS. 4 and 5, the sleeve 67 is centrally located about the latch side member 25. The sleeve 67 is a short cylindrical tube that has an inside diameter that is slightly larger than the outer diameter of the latch side member 25 so the sleeve 67 may rotate about the side member 25. Upper and lower stops 81 and 83 extend about the side member 25 immediately above and below the sleeve 67. The sleeve 67 is prevented from moving translationally along the side member 25 by the stops 81 and 83. In a preferred embodiment the sleeve 67 is formed of a durable metal such as galvanized steel, and the stops 81 and 83 are metal collars welded to the side member 25.

Referring now to FIGS. 1 and 4, the gate latch 35 is coupled to the sleeve 67 so the gate latch 35 may be latched and unlatched about the latch post 29 by rotation of the sleeve 67. The gate latch 35 is comprised of two arms 85 coupled to the sleeve 67 extending outwards from the sleeve 67 with a gap 87 between the arms 85. The arms 85 have sufficient length to extend about the latch post 29 with the latch post 29 located in the gap 87 between the arms 85 when the latch side member 25 is located adjacent the post 29. The gate latch 35 rotates with the sleeve 67 so that the gate latch 35 may be moved between a latched position about the post 29 (shown by solid lines in FIG. 1) and an unlatched position rotated away from the post 29 (shown by dashed lines in FIG. 1) by rotation of the sleeve 67. In a preferred embodiment the arms 85 of the gate latch 35 are formed with bent metal bars welded to the sleeve 67.

As shown in FIG. 5, a notch 89 extends through the sleeve 67 and the upper stop 81 for enabling the rod 67 to removably secure the gate latch 35 in its latched position. The notch 89 has an upper portion 91 extending through the upper stop 81 and a lower portion 93 extending through the sleeve 67. When the gate latch 35 is located in its latched position, the upper and lower portions 91 and 93 of the notch 89 are aligned with each other extending over the slot 79 in the side member 25. The rod 69 may extend from the cavity 77 through the slot 79 and through the notch 89 in a locking position with the rod 69 extending through the lower portion 93 of the notch 89 when the upper and lower portions 91 and 93 are aligned. The rod 69 prevents rotation of the sleeve 67 about the side member 25 when the rod 69 is located in its locking position in the lower portion 93 of the notch 89, thereby locking the gate latch 35 in its latched position. The rod 69 may be raised to an unlocking position with the rod 69 extending through the slot 79 and through the upper portion 91 of the notch 89. The sleeve 67 may be rotated about the side member 25 to move the gate latch 35 from its latched position into an unlatched position when the rod 69 is located in its unlocking position.

When the gate latch is located in an unlatched position, the lower portion 93 of the notch 89 is rotated relative to the upper portion 91 of the notch 89 so the upper and lower portions 91 and 93 are not aligned. Only the upper portion 91 of the notch 89 remains aligned with the slot 79 and in communication with the cavity 77. The rod 69 bears on the upper edge of the sleeve 67. The sleeve 67 may be freely rotated about the side member 25 when the rod is located in its unlocking position.

Referring now to FIGS. 4 and 5, the rod 69 is located in the latch side member 25 extending through the cavity 27 from the slot 79 to the top end 73 of the side member 25. The main body 95 of the rod 69 extends through the cavity 77. A inverted "L" shaped hooked end 97 of the rod 69 extends from the body 95 of the rod 67 through the slot 79 and the notch 89. The hooked end 97 is bent from the body 95 with an arm 99 extending transverse to the body 95 through the slot 79 and notch 89, and a leg 101 bent transverse to the arm 99 outside the sleeve 67. The leg 101 prevents the hooked end 97 of the rod 69 from being drawn into the cavity 77 of the side member 25 through the slot 79 and notch 89. A washer 100 (see FIG. 5) is coupled to the arm 99 of the rod abutting the side member 25 adjacent the slot 79 within the cavity 77 to prevent the rod 69 from being drawn through the slot 79 and notch 89 and to stabilize the rod 69 in the cavity 77. There can be provided an outer washer as well. A threaded top end 103 of the rod 69 extends through the cap 71 at the top end 73 of the side member 25 and is fastened to the cap 71 by nut 105 and cap nut 107 which threadably couple the end 103 of the rod 69.

As disclosed above, the rod 69 may assume a locking and an unlocking position in the side member 25. In its locking position the rod 69 is lowered with the hooked end 97 extending through the slot 79 and through the lower portion 93 of the notch 89 in the sleeve 67. The hooked end 97 bears on the bottom end of the notch 89. In its unlocking position, the rod 69 is raised with the hooked end 97 extending through the slot 79 and through the upper portion 91 of the notch 89 in the upper stop 81. Upward movement of the rod is limited by the hooked end 97 contacting the top end of the notch 89. The rod 69 may be moved between its locking and unlocking positions by lifting or lowering the rod 69 in the desired direction when the upper and lower portions 91 and 93 of the notch 89 are aligned. The rod 69 is lifted or lowered by lifting or lowering the cap 71 to which the rod 69 is attached.

As shown in FIG. 1 and 4, the cap 71 movably fits over the top end 73 of the side member 25. The cap 71 comprises a cylindrical wall 109 with a top wall 111 integrally coupled across an end of the cylindrical wall 109. The top wall 111 and cylindrical wall 109 enclose a cavity 113 therebetween. The cylindrical wall 109 has an inner diameter slightly larger than the outer diameter of the side member 25 so the cylindrical wall 109 slidably fits over the top end 73 of the side member 25 with the top end 73 located in the cavity 113. The rod 69 is coupled to the cap 71 through the top wall 111 of the cap 71.

The cap 71 may be moved between upper and lower positions about the top end 73 of the side member 25 to adjust the rod 69 between its unlocking and locking positions, respectively. In the cap's 71 lower position, corresponding to the locking position of the rod 69, the top wall 111 of the cap 71 is preferably located abutting the top end 73 of the latch side member 25. In the cap's 71 upper position, corresponding to the unlocking position of the rod 69, the top wall 111 of the cap 71 is lifted from top end 73 of the side member 25 a distance corresponding to the distance the hooked end 97 of the rod 69 is lifted from the lower portion 93 of the notch 89 to the upper portion 91 of the notch 89. The cap 71 slides easily about the top end 73 of the side member 25 so the cap 71 may be easily moved between its upper and lower positions. The latch side member 25 extends above the latch post 29 so the cap 71 on the top end 73 of the side member 25 may be easily reached to adjust the rod 69 to a desired position.

The rod 69 may be secured in its locking position with a conventional padlock 70 to prevent the gate latch 35 from being unlatched from the latch post 29. Referring to FIG. 4, a stop 115 is integrally coupled about the rod 69 in the cavity 77 in the side member 25 near the top end 73 of the side member 25. The stop 115 is wider than the diameter of the rod 69. Lock apertures 117 extend through the cylindrical wall 109 of the cap 71 and through the side member 25 directly above the top 119 of the stop 115 when the rod 69 is located in its locking position. The lock apertures 117 are sized and positioned to accept a shackle of the padlock therethrough, where the shackle of the padlock may extend into one lock aperture 117 and out the other lock aperture 117. Upon locking the padlock, the shackle of the padlock blocks the upward movement of the stop 115 thereby preventing the rod 69 from being lifted out of its locking position to unlatch the gate latch 35. Removal of the shackle of the padlock from the lock apertures 117 permits free movement of the rod 69 longitudinally inside of the cavity 77 between its locking and unlocking positions. In a preferred embodiment, the stop 115 is a cylindrical metal bar welded to the rod 69 with the rod 69 extending through the longitudinal axis of the metal bar.

In operation, the close fitting gate 11 is easily used. Referring to FIG. 1, in order to secure the gate 11 between the latch post 29 and the hinge post 27 of the fencing sections 13 the gate 11 is pulled to a closed position between the latch post 29 and the hinge post 27 by swinging the hinge side member 23 inside of the hinges 31 that couple the hinge post 27 to the hinge side member 27. As the gate 11 is being moved to a closed position, the cap 71 on the latch side member 25 is lifted to lift the rod 69 into its unlocking position. The sleeve 67 is rotated to position the gate latch 35 to receive the latch post 29 into the gap 87 between the gate latch arms 85. As the gate 11 is swung closed, the latch post 29 causes the arms 85 and the sleeve 67 to rotate. When the gate 11 is closed, the sleeve 67 is positioned with the lower notch portion 93 aligned with the upper notch portion 91 in the upper stop 81. The gate latch 35 is secured in its latched position by lowering the cap 71 onto the top end 73 of the latch side member 25. This action moves the rod 69 to position the hooked end 97 of the rod 69 in the lower portion 91 of the notch 89. The sleeve 67 is prevented from rotating by the rod 69 located in the lower notch portion 91 so the gate latch 35 is securely latched to the latch post 29. If desired, a padlock may be extended through the lock apertures 117 to prevent the gate 11 from being opened by unauthorized persons.

The latched gate 11 may be opened by initially removing the padlock from the latch apertures 117. The cap 71 is lifted to raise the rod 69 so the hooked end 97 of the rod 69 is lifted from the lower notch portion 93 in the sleeve 67. The gate 11 can then be pushed open, wherein the sleeve 67 is rotated to move the gate latch 35 from its latched position about the latch post 29 to an unlatched position where the gate latch 35 is not located about the latch post 29.

When the gate 11 is closed, both side members 23, 25 are located very close to their respective fence posts 27, 29. The gap between the gate side members and the fence posts is small (between ⅛–½ inches). This close fit between the gate and the fence posts is useful for providing an enclosure for ostriches and emus. These birds are unable to fit their necks in the gap between the gate and fence posts.

The foregoing disclosure and the showings made in the drawings are merely illustrative of the principles of the invention and are not to be interpreted in a limiting sense.

We claim:

1. A close fitting gate, comprising:

a frame;

fencing material supported by said frame, said fencing material forming a barrier;

said frame having a side member, said side member having a main portion, said main portion having elbows therein so as to form offset portions, said offset portions being parallel to said main portion of said side member;

a hinge coupled to each offset portion; wherein said offset portions rotate within said respective hinges.

2. The gate of claim 1, wherein said fencing material comprises chain link fencing material.

3. The gate of claim 1, wherein said side member comprises a tube.

4. The gate of claim 1, wherein one of said offset portions is U-shaped.

5. The gate of claim 1, wherein one of said offset portions is L-shaped.

6. A close fitting gate, said gate comprising a frame and fencing material supported by a frame, comprising:

said frame comprising a member having a wall that defines a cavity, said wall having a slot extending therethrough;

a sleeve rotatably coupled about said member, said sleeve having a notch therein that aligns with and overlaps a portion of said slot when said sleeve is in a locking position;

a rod located within said cavity, said rod having a hooked end located in said slot, said rod being structured and arranged to extend between and assume first and second positions;

in said first position said rod is positioned with its hooked end extending through said slot and through said notch in said sleeve, said sleeve being located in its locking position, preventing rotation of said sleeve about said member;

in said second position said rod is positioned with its hooked end extending through said slot, said hooked end being located outside of said sleeve notch, said sleeve being free to rotate about said member;

a gate latch coupled to said sleeve, said gate latch being structured and arranged to be removed from a fence post by rotation of said sleeve from its locking position;

a cap located about an end of said member, said rod having first and second ends, said first end of said rod being coupled to said cap and said second end of said rod comprising said hooked end;

said cap being moveable relative to said member.

7. A close fitting gate, said gate comprising a frame and fencing material supported by a frame, comprising;

said frame comprising a member having a wall that defines a cavity, said wall having a slot extending therethrough;

a sleeve rotatably coupled about said member, said sleeve having a notch therein that aligns with and overlaps a portion of said slot when said sleeve is in a locking position;

a rod located within said cavity, said rod having a hooked end located in said slot, said rod being structured and arranged to extend between and assume first and second positions;

in said first position said rod is positioned with its hooked end extending through said slot and through said notch in said sleeve, said sleeve being located in its locking position, preventing rotation of said sleeve about said member; in said second position said rod is positioned with its hooked end extending through said slot, said hooked end being located outside of said sleeve notch, said sleeve being free to rotate about said member;

a gate latch coupled to said sleeve, said gate latch being structured and arranged to be removed from a fence post by rotation of said sleeve from its locking position;

wherein said member is a tubular member and said rod extends in said tubular member generally concentric with said tubular member.

8. A close fitting gate, comprising:

a frame;

fencing material supported by said frame, said fencing material forming a barrier;

said frame having a side member, said side member having a main portion, said main portion having elbows therein so as to form offset portions, said offset portions being parallel to said main portion of said side member;

a hinge coupled to each offset portion;

a hinge post that is parallel to and located adjacent to said side member;

each of said hinges having first and second ends, with each of said hinges being coupled to said respective offset portion by said first end being clamped around said respective offset portion, and said second end being clamped around said hinge post.

9. A close fitting gate, said gate comprising a frame and fencing material supported by a frame, comprising;

said frame comprising a member having a wall that defines a cavity, said wall having a slot extending therethrough;

a sleeve rotatably coupled about said member, said sleeve having a notch therein that aligns with and overlaps a portion of said slot when said sleeve is in a locking position;

a rod located within said cavity, said rod having a hooked end located in said slot, said rod being structured and arranged to extend between and assume first and second positions;

in said first position said rod is positioned with its hooked end extending through said slot and through said notch in said sleeve, said sleeve being located in its locking position, preventing rotation of said sleeve about said member;

in said second position said rod is positioned with its hooked end extending through said slot, said hooked end being located outside of said sleeve notch, said sleeve being free to rotate about said member;

a gate latch coupled to said sleeve, said gate latch being structured and arranged to be removed from a fence post by rotation of said sleeve from its locking position;

said member has an end;

said rod extends inside of said cavity from said slot to said end, said rod having first and second ends, with said first end of said rod being located adjacent to said member end so as to be accessible form an exterior of said member, and with said second end of said rod comprising said hooked end;

a stop coupled to said rod at a location adjacent to said member end;

openings in said member located adjacent to said member end, said openings being between said stop and said member end when said rod is in said first position, said openings being structured and arranged to receive a lock.

* * * * *